US012704213B2

(12) United States Patent
Gianchandani et al.

(10) Patent No.: US 12,704,213 B2
(45) Date of Patent: Aug. 11, 2026

(54) AUTONOMOUS MICROSYSTEM FOR IMMERSION INTO FLUID

(71) Applicants: THE REGENTS OF THE UNIVERSITY OF MICHIGAN, Ann Arbor, MI (US); TOTALENERGIES ONETECH, Courbevoie (FR)

(72) Inventors: Yogesh B. Gianchandani, Ann Arbor, MI (US); Alexander Benken, Ann Arbor, MI (US); Neeharika Vellaluru, Ann Arbor, MI (US); Partha Dutta, Ann Arbor, MI (US); John-Richard Ordonez-Varela, Houston, TX (US); Aurelie Le-Beulze, Courbevoie (FR); Jean-Gregoire Boero-Rollo, Courbevoie (FR)

(73) Assignees: The Regents of The University of Michigan, Ann Arbor, MI (US); TotalEnergies OneTech, Courbevoie (FR)

( * ) Notice: Subject to any disclaimer, the term of this patent is extended or adjusted under 35 U.S.C. 154(b) by 659 days.

(21) Appl. No.: 18/035,062

(22) PCT Filed: Nov. 6, 2020

(86) PCT No.: PCT/US2020/059333

§ 371 (c)(1),
(2) Date: May 2, 2023

(87) PCT Pub. No.: WO2022/098361

PCT Pub. Date: May 12, 2022

(65) Prior Publication Data

US 2024/0011593 A1 Jan. 11, 2024

(51) Int. Cl.
*G01M 3/00* (2006.01)
*F16L 55/40* (2006.01)
(Continued)

(52) U.S. Cl.
CPC ............. *F16L 55/40* (2013.01); *E21B 47/138* (2020.05); *F16L 2101/30* (2013.01)

(58) Field of Classification Search
CPC ....... F16L 55/40; F16L 2101/30; F16L 55/46; E21B 47/138; E21B 47/14; E21B 47/26;
(Continued)

(56) References Cited

U.S. PATENT DOCUMENTS 7,021,147 B1 4/2006 Subramanian et al.
9,880,143 B2 1/2018 Wörtche et al.
(Continued)

FOREIGN PATENT DOCUMENTS

CN 209274860 U * 8/2019
CN 111175850 A * 5/2020 ........... G05D 1/0206
(Continued)

OTHER PUBLICATIONS

International Search Report and Written Opinion regarding International Application No. PCT/US2020/059333, dated Feb. 4, 2021; ISA/US.

(Continued)

*Primary Examiner* — Robert R Raevis
(74) *Attorney, Agent, or Firm* — Harness, Dickey & Pierce, PLC

(57) ABSTRACT

In various aspects, the present disclosure provides an example autonomous microsystem for immersion into a fluid. The autonomous microsystem includes electronics, a power source, and a packaging system that surrounds the electronics and the power source. The electronics can be configured to sense and record one or more environmental conditions. The packaging system may include a deformable shell that defines an internal space and a plurality of filler particles disposed in the internal space and configured to control a density of the autonomous microsystem in relation (Continued)

to the fluid. The filler particles may comprise a low-density material having a bulk density greater than or equal to about 100 kg/m$^3$ and less than or equal to about 1,000 kg/m$^3$ and have a packing density greater than or equal to about $10^{11}$/m$^3$ and less than or equal to about $10^{21}$/m$^3$.

20 Claims, 8 Drawing Sheets

(51) Int. Cl.
*E21B 47/12* (2012.01)
*F16L 101/30* (2006.01)

(58) Field of Classification Search
CPC ........ H02J 50/005; H02J 50/10; G01M 3/005; G01W 1/08
USPC ....................... 73/19.01, 31.01, 31.02, 32 R, 73/152.51–152.55, 170.28, 170.34, 438, 73/714, 865.8, 866, 431; 374/141–143, 374/208; 166/250.1, 252.1–252.6, 166/250.03, 250.07
See application file for complete search history.

(56) References Cited

U.S. PATENT DOCUMENTS

| | | | | |
|---|---|---|---|---|
| 10,769,684 | B1 * | 9/2020 | Kushner | F01D 15/00 |
| 2015/0210367 | A1 * | 7/2015 | Castellanet | H02J 50/10 361/679.01 |
| 2017/0174506 | A1 | 6/2017 | Gianchandani et al. | |
| 2018/0325373 | A1 | 11/2018 | Rodger et al. | |

FOREIGN PATENT DOCUMENTS

| | | | | |
|---|---|---|---|---|
| DE | 10 2014 015 781 | * | 4/2016 | |
| EP | 2634083 | A1 * | 9/2013 | B63C 7/10 |
| EP | 3 336 505 | A2 | 6/2018 | |
| EP | 3 677 889 | A1 | 7/2020 | |
| WO | WO-03100153 | A1 | 12/2003 | |
| WO | WO-2016/176643 | A1 | 11/2016 | |
| WO | WO-2019/075297 | A1 | 4/2019 | |
| WO | WO-2019/161277 | A1 | 8/2019 | |

OTHER PUBLICATIONS

Search Report issued in related application AEP6001055/2023, Dated Nov. 24, 2025.

* cited by examiner

AUTONOMOUS MICROSYSTEM FOR IMMERSION INTO FLUID

CROSS-REFERENCE TO RELATED APPLICATIONS

This application is a 371 U.S. National Phase of International Application No. PCT/US2020/059333, filed on Nov. 6, 2020. The entire disclosure of all of the above application is incorporated herein by reference.

FIELD

The present disclosure relates to autonomous microsystems for immersion into a fluid and the logging of certain environmental conditions therewithin.

BACKGROUND

This section provides background information related to the present disclosure which is not necessarily prior art.

Microsystems are miniaturized functional systems incorporating microelectromechanical systems (MEMS), microelectronics, and packaging systems. Microsystems often include microfabricated systems (such as one or more sensing and/or actuation elements, controller(s), communication module(s), and power source(s)) disposed within an encapsulating package. Microfabricated systems may be configured to sense, record, and transmit data to an external monitoring system. For example, microsystems can be used in the instance of fluid transportation, storage, and processing to access the structural health and process conditions of pipes, reservoirs, reactor vessels, heat exchangers, and other fluidic infrastructure elements. In such instances, microsystems can provide diagnostic data while minimizing disruption to normal operations, such as commonly experienced during use of conventional devices (i.e., "Smart pigs") that travel within the interior of a pipe to perform cleaning and diagnostic function and generally occupy an entire diameter of the pipeline and are costly and complex to deploy.

Microsystems (e.g., environmental logging microsystems (ELMs)), however, need to be configured to withstand the environmental conditions into which the microsystem is deployed. For example, in the instance of downhole monitoring of wellbores, such as those employed during exploration and production of oil and natural gas, the exterior layer of the microsystem must be unreactive and impervious to the caustic wellbore fluid environment that may include hydrogen sulfide ($H_2S$), raw natural gases and oils, and/or have high saline concentrations, while also permitting the transfer of pressure, temperature, magnetic, and inertial data to the sensing elements defining the microsystem. Further still, such wellbore environments often have areas subject to pressures up to about 50 MPa and temperatures commonly between about 85° C. and 150° C. The microsystem must be capable of surviving within such environments, while also sensing and recording the environmental conditions with sufficient resolution. Accordingly, it would be desirable to develop autonomous microsystems and methods for operation of such within various environments.

SUMMARY

This section provides a general summary of the disclosure, and is not a comprehensive disclosure of its full scope or all of its features.

In various aspects, the present disclosure provides an example autonomous microsystem for immersion into a fluid. The autonomous microsystem may include electronics, a power source, and a packaging system that surrounds the electronics and the power source. The electronics can be configured to sense and record one or more environmental conditions. The packaging system may include a deformable shell that defines an internal space and a plurality of filler particles disposed in the internal space and configured to control a density of the autonomous microsystem in relation to the fluid. The filler particles may comprise a low-density material having a bulk density greater than or equal to about 100 kg/m$^3$ and less than or equal to about 1,000 kg/m$^3$ and have a packing density greater than or equal to about $10^{11}$/m$^3$ and less than or equal to about $10^{21}$/m$^3$.

In one aspect, a flexible pouch may also be disposed within the internal space. The flexible pouch may be configured to house the electronics.

In one aspect, the flexible pouch may be filled with a dielectric fluid.

In one aspect, the electronics may include a wireless power transfer circuit that can be configured to receive electrical power wirelessly from an external power source and to supply power to the autonomous microsystem.

In one aspect, each of the deformable shell and the flexible pouch may have a substantially flat surface. The substantially flat surface of the deformable shell may be adjacent to and parallel with the substantially flat surface of the flexible pouch. The wireless power transfer circuit may include a coil that is disposed adjacent to and parallel with the substantially flat surface of the flexible pouch in which it is disposed.

In one aspect, the power source may be a battery, and a relay may be electrically coupled between the wireless power transfer circuit, the battery, and the electronics. The relay may be configured to switch between supplying wireless power or battery power to the electronics.

In one aspect, the battery may be a rechargeable battery, and the relay may be further configured to switch between distributing wireless power between the electronics and the rechargeable battery.

In one aspect, each of the filler particles of the plurality of filler particles are hollow particles may have an average diameter greater than or equal to about 0.1 μm and less than or equal to about 100 μm.

In one aspect, an epoxy having a bulk density greater than or equal to about 300 kg/m$^3$ and less than or equal to about 2,000 kg/m$^3$ may also be disposed with the plurality of filler particles in the internal space.

In one aspect, a getter material may also be disposed within the internal space.

In one aspect, the deformable shell may be a non-metallic polymeric shell having a Shore A Hardness between about 40 and about 100.

In one aspect, the deformable shell may include first and second halves. The second half may be configured to receive the first half so as to form an enclosed structure that defines the deformable shell.

In one aspect, a structural support may be disposed on an interior-facing surface of the deformable shell adjacent to an overlap of the first and second halves of the deformable shell. The structural support may have a rigidity greater than the deformable shell.

In various aspects, the present disclosure provides another example autonomous microsystem for immersion into a fluid. The autonomous microsystem may include electronics configured to detect and record one or more environmental conditions and a packaging system that surrounds the electronics. The electronics may comprise a wireless power transfer circuit that is configured to receive electrical power wirelessly from an external power source and supply power to the electronics, and a battery that is also configured to supply power to the electronics. The packaging system comprises a deformable polymeric shell that defines an internal space, a flexible pouch disposed within the internal space and configured to house the electronics, and a plurality of hollow filler particles also disposed in the internal space and configured to control a density of the autonomous microsystem in response to the fluid. The deformable polymeric shell may have a first half and a second half. The second half may have a substantially flat surface and may be configured to receive the first half so as to form an enclosed structure that defines the deformable polymeric shell. The flexible pouch may include an insulating oil.

In one aspect, each of the deformable polymeric shell and the flexible pouch may have a substantially flat surface. The substantially flat surface of the deformable polymeric shell may be adjacent to and parallel with the substantially flat surface of the flexible pouch. The wireless power transfer circuit may include a coil that can be disposed adjacent to and parallel with the substantially flat surface of the flexible pouch in which it is disposed.

In one aspect, the power source may be a battery, and a relay may be electrically coupled between the wireless power transfer circuit, the battery, and the electronics. The relay can be configured to switch between supplying wireless power or battery power to the electronics.

In one aspect, the battery may be a rechargeable battery, and the relay can be further configured to switch between distributing wireless power between the electronics and the rechargeable battery.

In one aspect, the plurality of hollow filler particles may be cenospheres having a bulk density greater than or equal to about 100 $kg/m^3$ and less than or equal to about 1,000 $kg/m^3$ and have a packing density greater than or equal to about $10^{11}/m^3$ and less than or equal to about $10^{21}/m^3$.

In one aspect, at least one of an epoxy having a bulk density greater than or equal to about 300 $kg/m^3$ and less than or equal to about 2,000 $kg/m^3$ and a getter material may also be disposed with the plurality of filler particles in the internal space.

In one aspect, the deformable polymeric shell may have a Shore A Hardness between about 40 and about 100.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
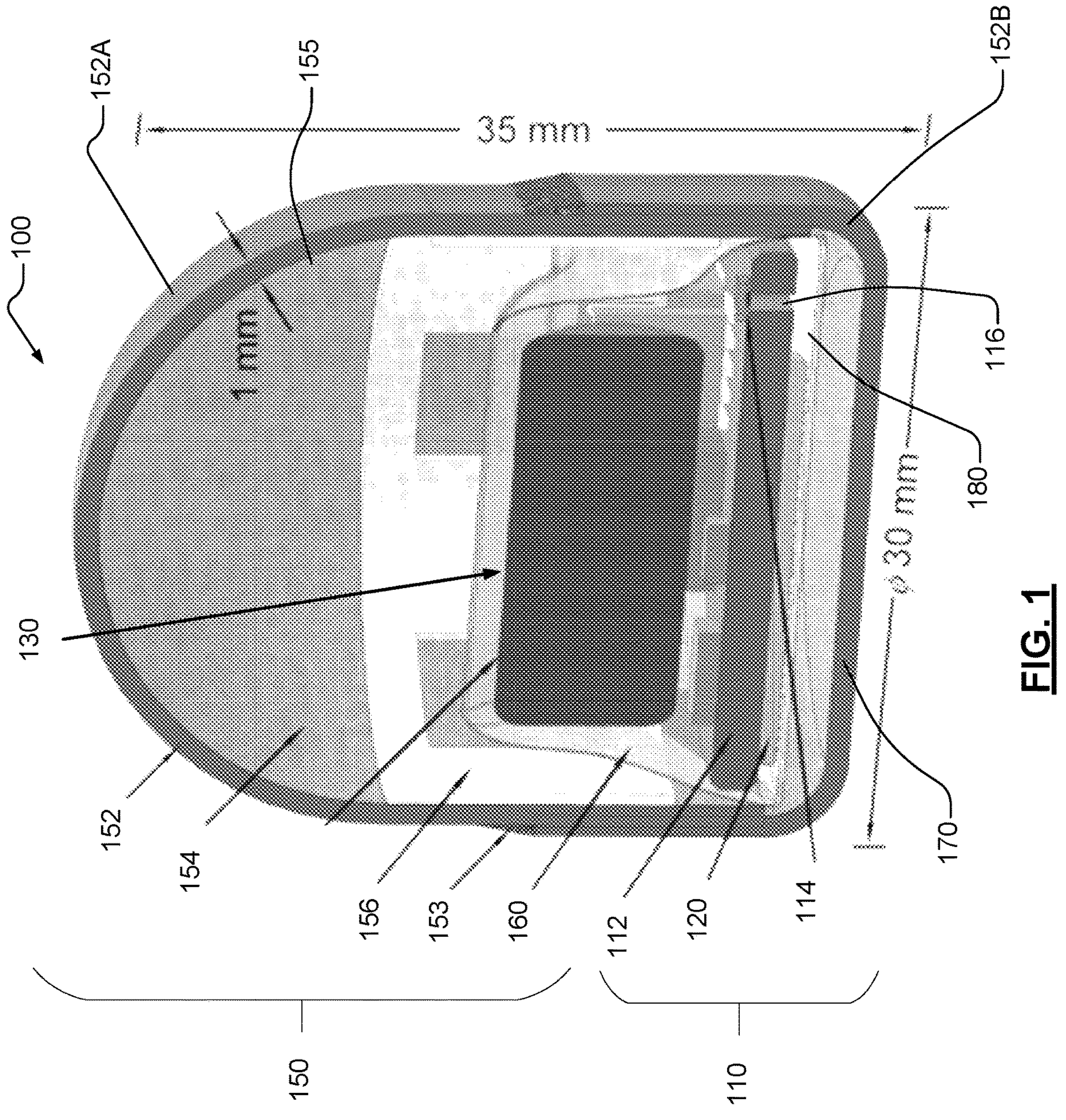
FIG. 1 is a cross-section illustration of an example autonomous microsystem in accordance with various aspects of the current technology.
Figure 2:
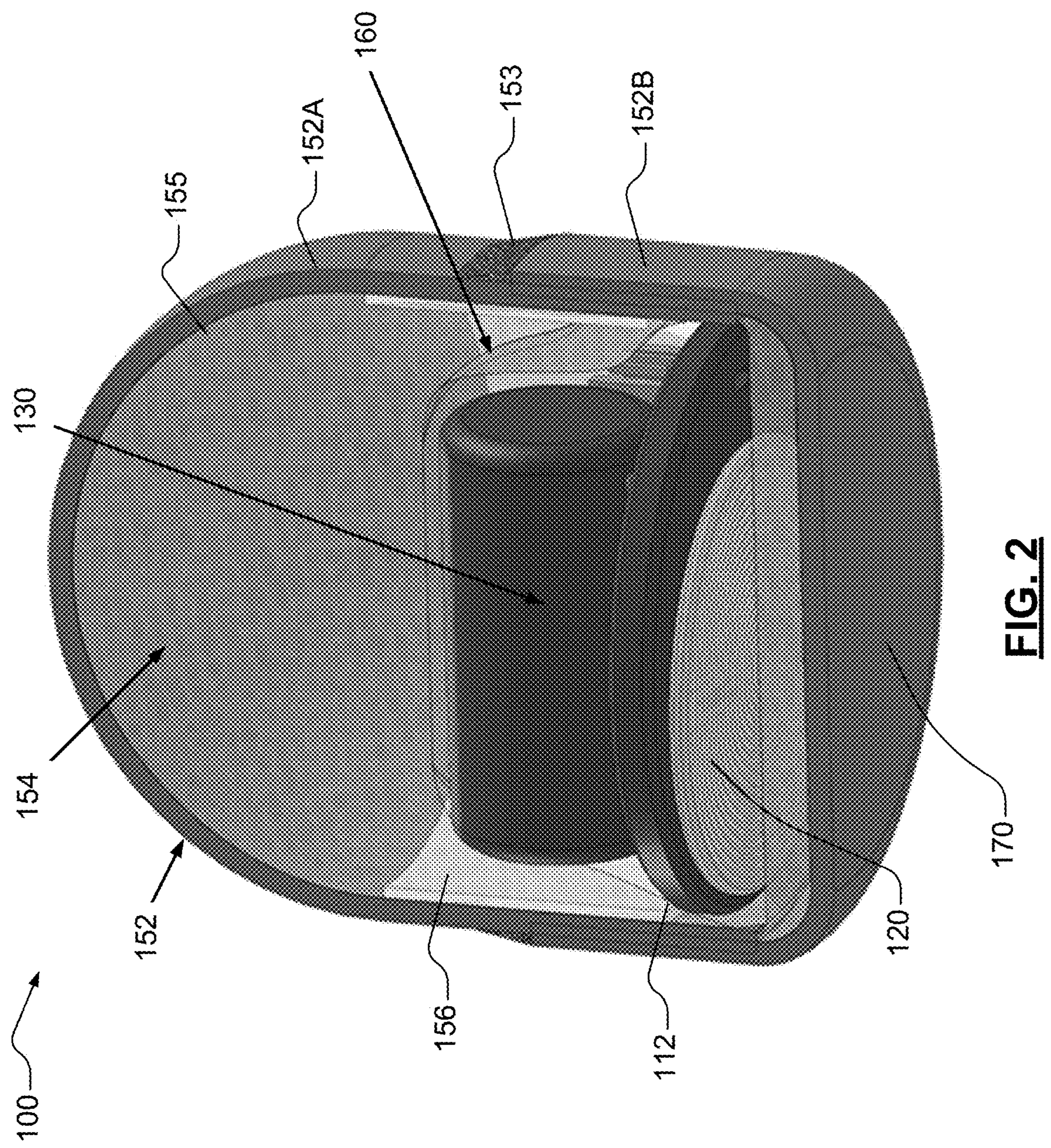
FIG. 2 is a partial cross-sectional illustration of the example autonomous microsystem illustrated in FIG. 1.

The present disclosure relates to small-scale recording devices-microsystems for immersion into a fluid (for example, oil) and the logging of certain environmental conditions therewithin, such as pressure, temperature, acceleration, and magnetic field. An exemplary illustration of an autonomous microsystem 100 for immersion into a fluid and the logging of environmental conditions therewithin is shown in FIG. 1. The microsystem 100 comprises electronics 110, a power source 130, and a packaging system 150 that surrounds and encompasses the electronics 110 and the power source 130. The microsystem 100 has a system density of less than about 1,200 $kg/m^3$. As illustrated, the microsystem 100 may have a first dimension (i.e., height) of about 35 mm and a second dimension (i.e., width) of about 30 mm, such that each dimension of the microsystem is less than about 40 mm.

The packaging system 150 provides protection to the electronics 110 and the power source 130 (e.g., chemical and abrasion resistance), while also permitting the transmission of all the sensed environmental parameters, as well as the transfer or transmission of programming parameters, input control commands, and/or sensed data relating to, for example, physical properties (such as, pressure and temperature), as well as electromagnetic signals (such as, magnetic fields for a magnetometer, wireless power transfer fields, and wireless commands for microsystem programming and data transfer). The packaging system 150 comprises a deformable shell 152 that defines an internal space 154 and a plurality of filler particles 156 disposed within the internal space 154.

The deformable shell 152 may have a material thickness greater than or equal to about 0.02 mm to less than or equal to about 4 mm, and in certain aspects, optionally about 1 mm. The deformable shell 152 may be a non-metallic polymeric shell having sufficient flexibility so as to permit pressure transmission. For example, the deformable shell 152 may be a non-metallic polymeric shell having a Shore A Hardness between about 40 and about 100. The deformable shell 152 can include a high-density polymeric material (e.g., about 1,800 $kg/m^3$), which also resists brittleness after long-term heat exposure. For example, in the instance of oil applications, the deformable shell 152 may comprise, for example only, one or more fluoro-elastomers (such as VITON® Type A, Type B, or Type F) or perfluoro-elastomers (such as sold by KALREZ®). In other applications, the deformable shell 152 may include, for example only, a silicone rubber. Though not illustrated, one or more thin-film coatings may be disposed on one or more surfaces of the deformable shell 152. The thin-film coatings may be used to provide additional modifications to the chemical, mechanical, transport, and electrical properties of the deformable shell 152. For example, a thin-film coating on an interior-facing surface of the deformable shell 152 of an impervious material may be used to mitigate gas diffusion through the deformable shell 152. In each instance, the deformable shell 152 includes a material that can be manufactured using standard commercial injection molding processes.

Figure 3:
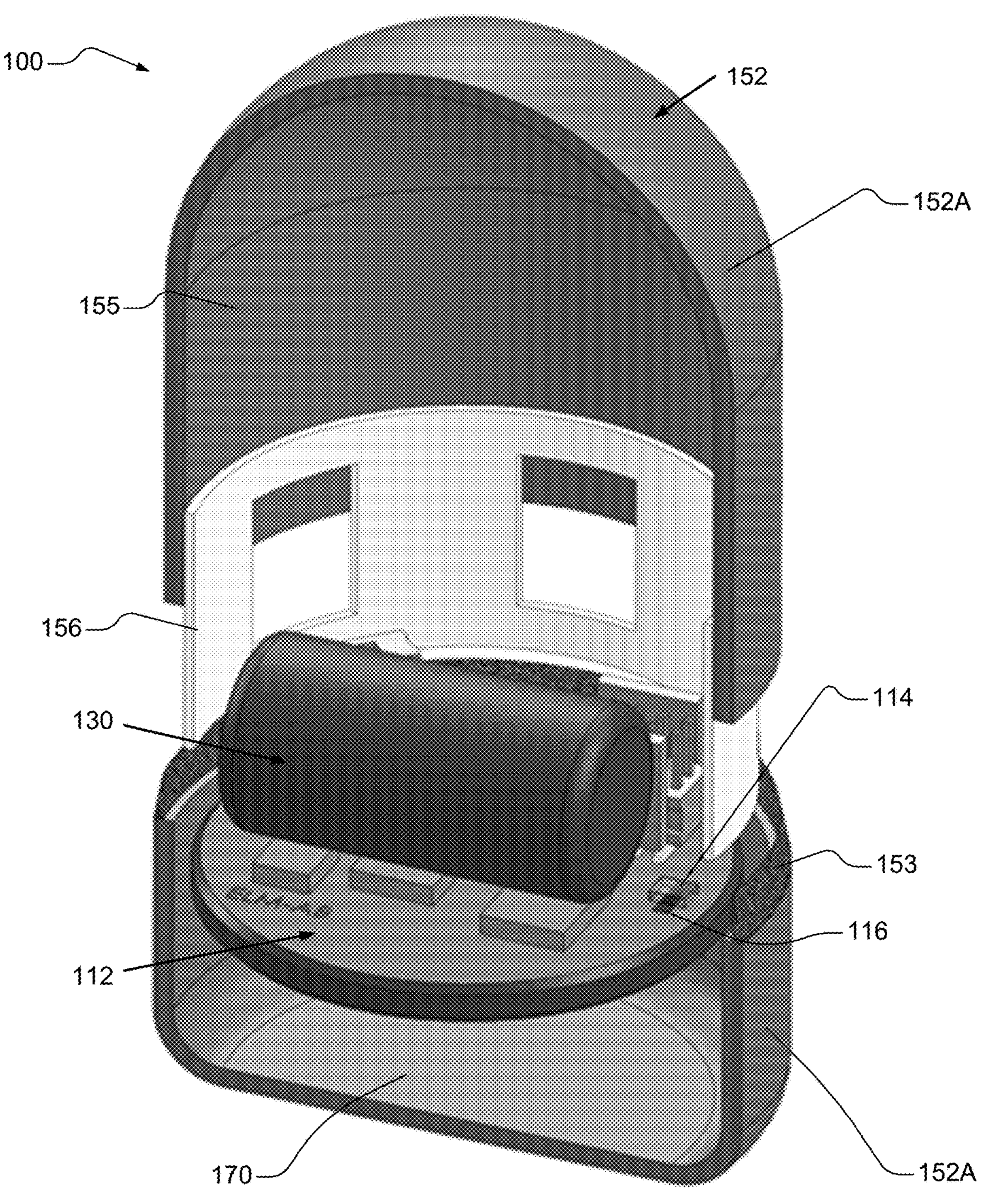
FIG. 3 is an exploded view of the partial cross-sectional illustrated provided in FIG. 2.

In certain instances, as illustrated, the deformable shell 152 includes first and second halves 152A, 152B. As best illustrated in FIG. 3, the second half 152B may be configured to receive the first half 152A so as to form the enclosed structure that defines the deformable shell 152. Such a two-part deformable shell structure may permit rapid assembly of the autonomous microsystem 100. In certain instances, a sealant 153 may be used to seal the interface between the first and second halves of the deformable shell 152. The sealant 153 must be capable of maintaining a low profile and withstanding the necessary chemical, thermal, and mechanical stresses imposed by environments in which the microsystem 100 may be deployed. In certain variations, the sealant 153 may be an epoxy sealant.

A structural support 156 may be disposed on or adjacent to an interior-facing surface 155 of the deformable shell 152. For example, as illustrated, the structural support 156 may be disposed on or adjacent to an overlap or interface of the first and second halves 152A, 152B. The structural support 156 has a rigidity greater than the deformable shell 152. The structural support 156 may comprise, for example only, one or more high-strength plastics, carbon fibers, ceramics, and/or metal alloys. The structural support 156 must be capable of supporting high-pressure environments in which the microsystem 100 may be deployed.

Figure 4:
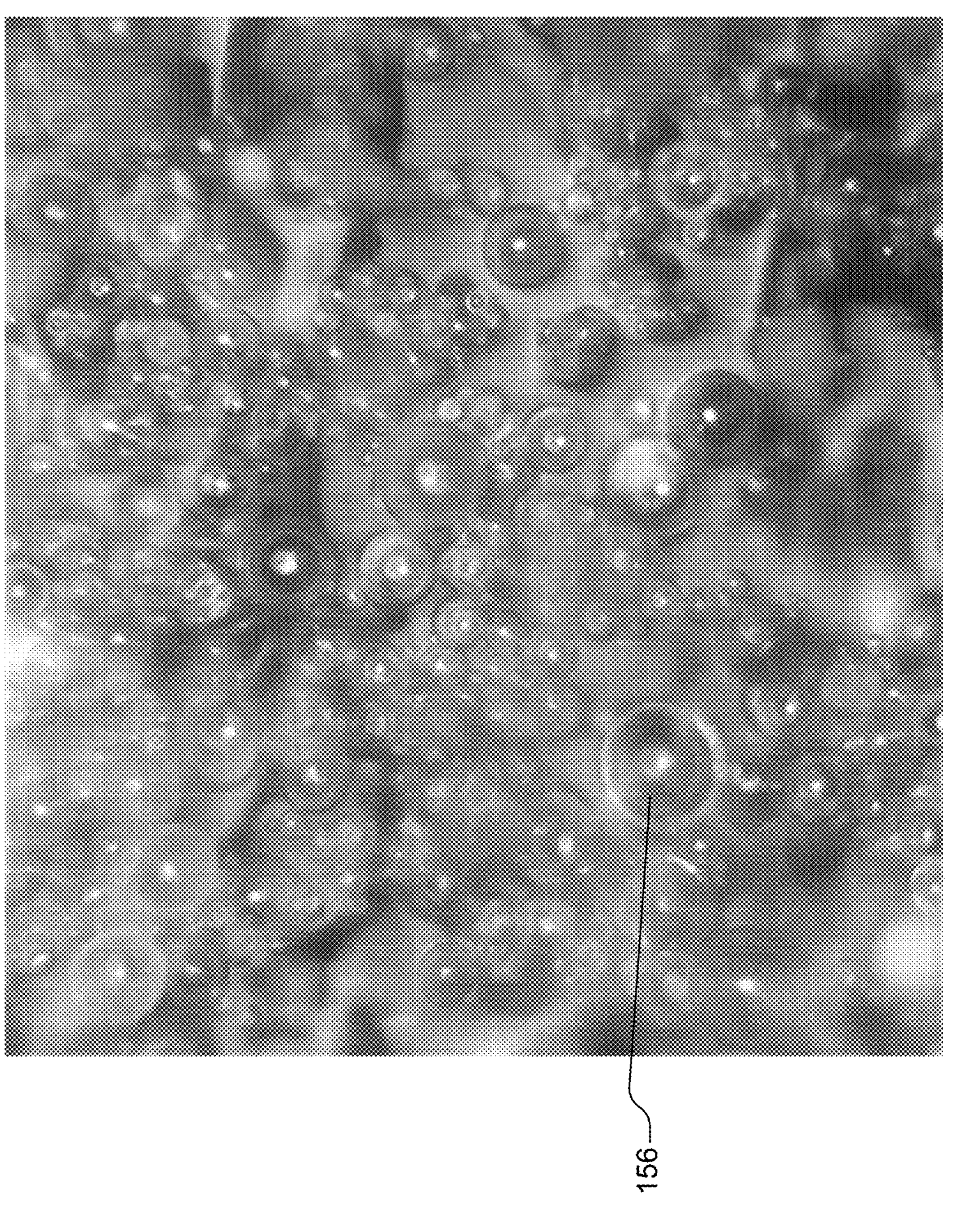
FIG. 4 is a microscopy image of filler particles in accordance with various aspects of the current technology.

The plurality of filler particles 156, for example, as illustrated in FIG. 4, are configured to control the density of the microsystem 100 of the autonomous microsystem 100 in relation to a fluid in which the microsystem 100 is immersed. For example, by adjusting the density of the filler particles 156 the microsystem 100 is able to be designed so as to have a density (i.e., target density) consistent with the intended application—that is, to have density-matched buoyancy, such that the microsystem 100 is free-flowing within the submerging fluid. In certain aspects, the filler particles 156 are selected such that the microsystem 100 has a system density of less than about 1,200 kg/m$^3$. For example, the filler particles 156 can comprise a low-density material having a bulk density greater than or equal to about 100 kg/m$^3$ and less than or equal to about 1,000 kg/m$^3$, and in certain instances, optionally greater than or equal to about 200 kg/m$^3$ and less than or equal to about 800 kg/m$^3$. The low-density material can also be a high-pressure compatible material, such that the filler particles 156 enable the transmission of pressure data by the microsystem 100. For example, the filler particles 156 may have a packing density greater than or equal to about $10^{11}$/m$^3$ and less than or equal to about $10^{21}$/m$^3$.

The filler particles 156 may be hollow particles having an average diameter greater than or equal to about 0.1 μm to less than or equal to about 100 μm. For example, the filler particles 156 may be cenospheres comprising silica and/or alumina. The miniature diameter and the high packing density of the filler particles 156 allow the filler particles 156 to transfer pressure. For example, the filler particles 156 may collectively act as an incompressible fluid.

An epoxy may be disposed with the filler particles 156 within the internal space 154. The epoxy may be a low-density and low-hardness epoxy. For example, the epoxy may have a Shore A Hardness of less than about 50. The epoxy may have a bulk density greater than or equal to about 300 kg/m$^3$ and less than or equal to about 2,000 kg/m$^3$. The epoxy may provide further mechanical support to the deformable shell 152, as well as reducing gas retention within the internal space 154 that may otherwise cause volume expansion as the exterior pressure and temperature are varied. For example, because the epoxy may adhere to the filler particles 156, the epoxy may reduce displacement between the filler particles 156 while maintaining flexibility and pressure transfer capabilities of the filler particles 156. The epoxy may reduce gas retention within the internal space 154 by filling interstitial spaces between the filler particles 156 such that smaller quantities of gas may become trapped in the package 150.

In further variations, one or more non-evaporable getter materials for gas trapping may be disposed with the filler particles 156 (and/or epoxy) within the internal space 154. The one or more getter materials may be alloys of zirconium and/or titanium incorporating iron, magnesium, nickel, and/or vanadium. Such materials may be used for trapping nitrogen, hydrogen, carbon dioxide, and other gases. In certain instances, the epoxy may act as a getter for volatile organic compounds. Less than or equal to about 1 gram of the one or more getter material may include in the internal space 154 with the filler particles 156 (and in certain aspects, epoxy).

In some embodiments, the packaging system 150 may further include a flexible pouch 160 also disposed within the internal space 154. The flexible pouch 160 may be configured to house the electronics 110. In this fashion, the flexible pouch 160 may form a barrier between the filler particles 156 and the electronics 110. The flexible pouch 160 may allow for easy retrieval of the electronics 110, permitting, for example only, rapid iteration and testing, replacement of damaged components, and/or replacement of a damaged exterior package (i.e., deformable shell 152 and/or filler particles 156). Like the deformable shell 152, the flexible pouch 160 may comprise a non-metallic polymer. The flexible pouch 160 may have a Shore A Hardness between about 20 and about 100, for example, when the flexible pouch 160 includes materials similar to that of the exterior deformable shell 152. The flexible pouch 160 may include VITON®, KALREZ®, KAPTON®, and/or nylon. The flexible pouch 160 may be filled with a dielectric fluid, such as mineral oil and/or silicone oil, by way of non-limiting example.

The electronics 110 are configured to sense and record one or more environmental conditions, such as pressure, temperature, acceleration, and magnetic field. For example, the electronics 110 may generally include a printed circuit board 112, and one or more environmental sensors, for example a pressure sensor 114 and/or an acoustic sensor (not shown), as well as other sensors as would be recognized by the skilled artisan. As illustrated, an opening 116 in the printed circuit board 112 may allow the pressure sensor 114 to be exposed to the dielectric fluid of the flexible pouch 160 and in turn the exterior pressure. Preferably there are no rigid obstructions in the path along which the pressure is transmitted from the exterior of the package 150 to a diaphragm of the pressure sensor 114.

Figure 6:
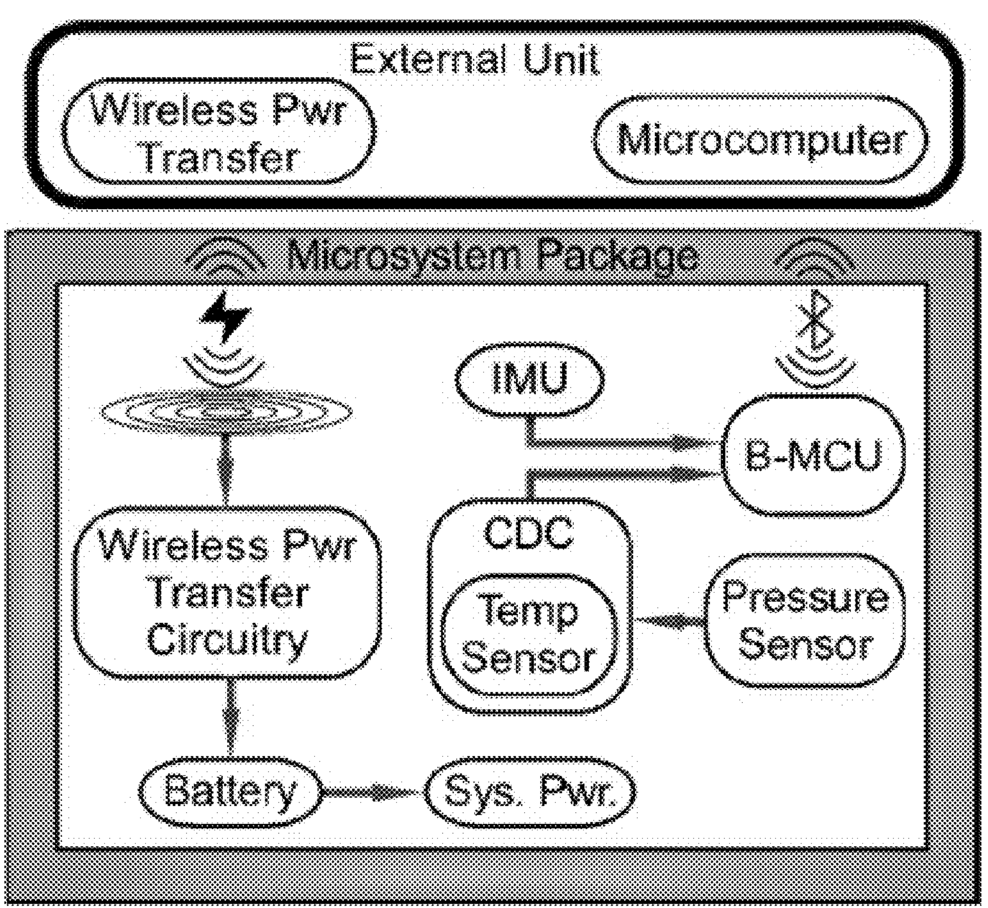
FIG. 6 is a functional diagram of example electronics, communication, and power transfer within the example autonomous microsystem illustrated in FIGS. 1-3.

The electronics 110 may also include a wireless power transfer circuit including a coil 120. As illustrated, the wireless power transfer coil 120 may be disposed substantially parallel with the printed circuit board 112. The wireless power transfer circuit is configured to receive electrical power wireless from an external power source (as shown in FIG. 6) so as to supply power to the microsystem 100. For example, the wireless power transfer circuit may be used to provide power to the microsystem 100 during high-power draw events, such as during device programming and data transfer prior to, or following, remote deployment.

In various instances, the wireless power transfer coil 120 may be a receiver coil positioned so as to be aligned with an external power transfer coil (not shown). More specifically, to achieve wireless power transfer, the two coils (e.g., the wireless power transfer coil 120 and an external power transfer coil) often need be brought within close proximity so as to become sufficiently coupled. For example, a Qi-certified commercial wireless power transfer standard may be utilized. In such instances, the maximum coil-to-coil separation distance over which such coils can support power transfer is primarily a function of coil size and alignment.

To achieve appropriate alignment, in certain instances, the deformable shell 152 (and in certain embodiments, the flexible pouch 160 contained therewithin) may have substantially flat surfaces 170, 180. For example, the deformable shell 152 may have a substantially flat surface 170, and in embodiments including the flexible pouch 160, the flexible pouch 160 may have a substantially flat surface 180. The substantially flat surface 170 of the deformable shell 152 may be adjacent to and parallel with a substantially flat surface 180 of the flexible pouch 160. The wireless power transfer coil 120 (and/or the other electronics 110) may be disposed adjacent to and parallel with the substantially flat surface 170 of the deformable shell 152 and/or the substantially flat surface 180 of the flexible pouch 160. The wireless power transfer coil 120 may have the largest size permitted by the packaging 150, including the deformable shell 152 and/or the flexible pouch 160.

In certain variations, the present disclosure provides various power management systems that are configured to increase an operational lifetime of the microsystem 100, for example by reducing current draw by the power source 130 (for example, a rechargeable battery, or in another example, a primary (non-rechargeable) battery). For example, in a first instance, a first power management system may be configured to reduce the power budget of the microsystem 100. In a second instance, a second power management system may be configured to reduce or substantially eliminate current draw from the power source 130 during wireless data transfer (as detailed above in the context of the wireless power transfer coil 120).

The microsystem 100 may be configured to remain in low power (i.e., "sleep state" or "power-down state") when data is not actively collected. In this low-power state, all components are set to a minimum power consumption mode. Nonetheless, the current draw in this low-power state is not negligible, which can be problematic when primary batteries are used as the power source 130. For example, some analog components cannot be digitally powered down and will continue to draw current. Further still, leakage current and current consumption of most electronic components will increase exponentially with temperature, even in a low-power state.

Figure 5A:
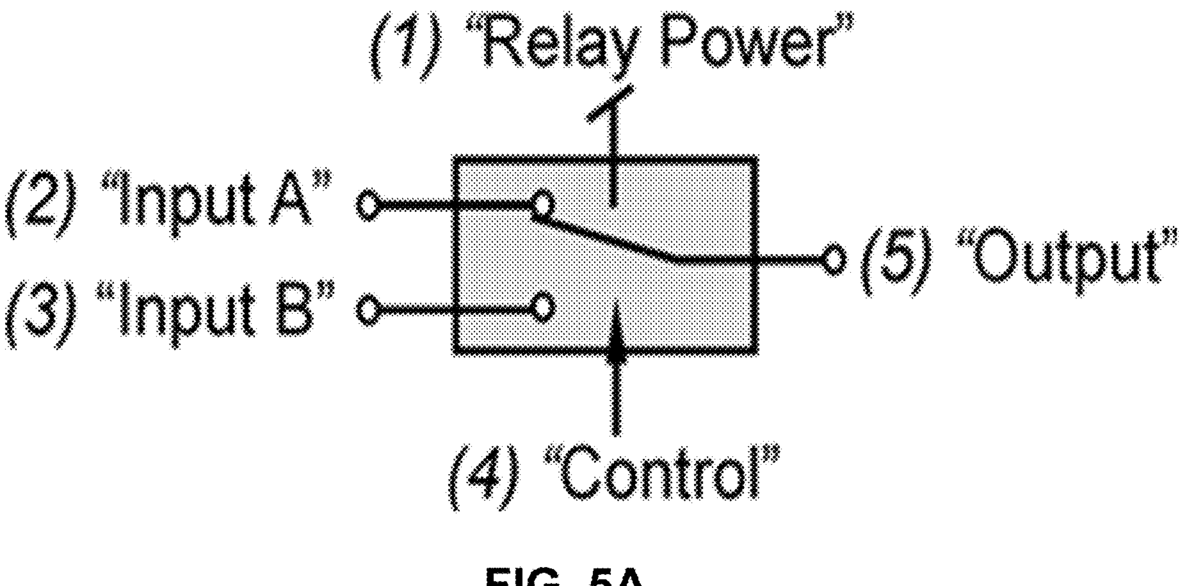
FIGS. 5A and 5B illustrate example electronics relay systems for use in the autonomous microsystem, such as the example autonomous microsystem illustrated in FIGS. 1-3.
Figure 5B:
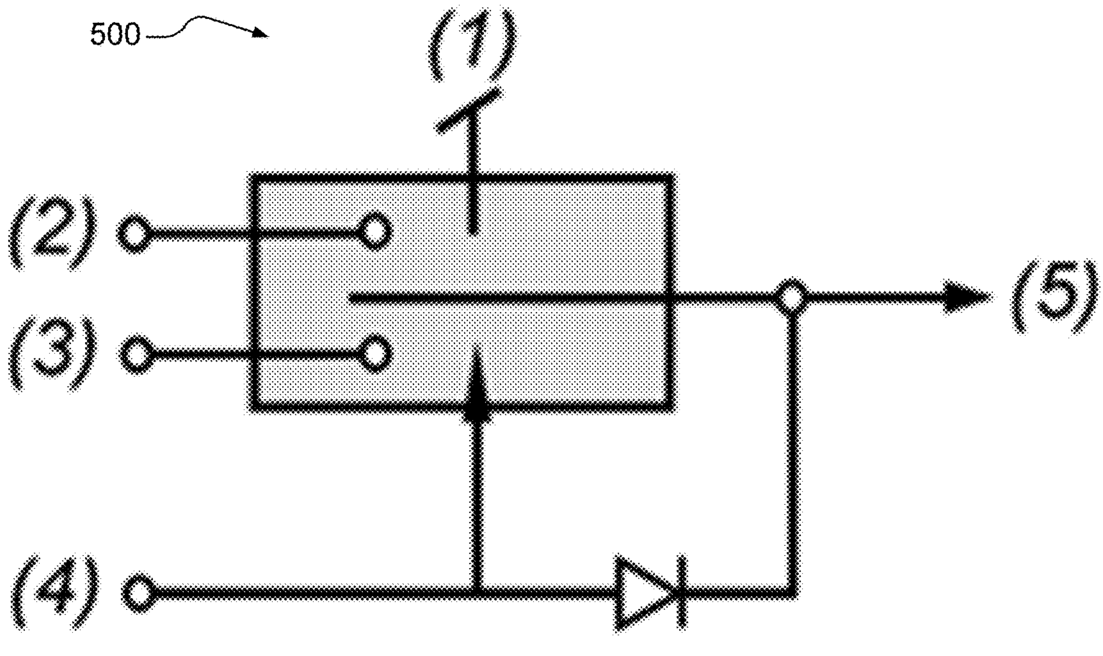

To reduce power use of the microsystem 100 in the low-power state, and especially at elevated temperatures, electronic relays, such as illustrated in FIGS. 5A-5B, are configured to disconnect all non-essential components (e.g., electronic sensors and sensor readout circuitry) from the power source 130. Disconnection of the non-essential components while the microsystem 100 is in a low-power state can improve the operational lifetime of the microsystem 100, especially when deployed in environments having elevated temperatures, as well as extending shelf-life when it is difficult to physically disconnect the power source 130 from the electronics 100.

The electronic relays can be further configured to disconnect the power source 130 for storage and/or to switch the microsystem 100 so as to be powered by the wireless power transfer circuitry instead of the battery. The electronic relays can be configured such that switching between power sources does not depended on any active electronics having power or programming. As such, the microsystem 100 can still operate using wireless power, even if the power source 130 (i.e., battery) has been depleted. If wireless power is not available, the electronic relays can automatically switch to the power source 130.

For example, a circuit schematic of an example relay 500 is illustrated in FIG. 5B. As illustrated, the example relay 500 (such as Model ADG819, manufactured by Analog Devices) includes five terminals. Terminal 1 may be a relay power terminal. Terminal 2 may correspond with an input A. Terminal 3 may correspond with an input B. Terminal 4 may be a control which controls which input (terminal 2 or 3) is passed through to terminal 5, which is an output. For example, when a low logic level is connected to terminal 4 ("control"), terminal 2 ("input A") is passed, when a high logic level is connected to terminal 4 ("control"), terminal 3 ("input B") is passed. When the relay is not powered, terminal 5 ("output") has a high impedance, effectively creating an open circuit at terminal 5 ("output"), passing neither terminal 2 ("input A") nor terminal 3 ("input B").

In the present instance, the microsystem power source (e.g., battery) 130 may be connected to terminal 1 ("relay power") and terminal 2 ("input A"); the output of the wireless power transfer circuitry (e.g., circuitry incorporating the coil 120) may connected to terminal 4 ("control") directly and to terminal 5 ("output") through a back-current limiting diode; the power bus of the microsystem 100 may connected to terminal 5 ("output"); and terminal 3 ("input B") may be left unconnected. In such instances, the microsystem 100 may have three scenarios in which it is receiving power: the first scenario may refer to instances where the battery 130 has sufficient charge to power the microsystem 100 and wireless power transfer is inactive; the second scenario may refer to instance where the battery 130 has sufficient charge to power the microsystem 100 and wireless power is active; and the third scenario may refer to instances where the battery 130 is depleted and wireless power is active.

In the first scenario, the relay is powered on and terminal 4 ("control") is at a logic low, permitting terminal 2 ("input A") to pass the battery power from terminal 2 ("input A") to terminal 5 ("output") and supply the microsystem. In the second scenario, the relay is powered on and terminal 4 ("control") is at a logic high, disconnecting the battery from the rest of the circuit and causing the open connection of terminal 3 ("input B") to pass to terminal 5 ("output"). In this case, the output of the wireless power circuitry will supply the microsystem 100, as it is connected to terminal 5 ("output") through the back-current limiting diode, bypassing the relay. In the third scenario, the relay is not powered, causing terminal 5 ("output") to be a high impedance port regardless of the logic level on terminal 4 ("control"). In this case, the output of the wireless power circuitry will supply the microsystem, as it is connected to terminal 5 ("output") through the back-current limiting diode, bypassing the relay.

FIG. 6 provides a functional diagram of example electronics, communication, and power transfer for microsystem 100. As illustrated, the internal electronics 110 may incorporate means for wireless communication, such as Bluetooth Low-Energy Master Control Unit (B-MCU), capacitance-to-digital converter (CDC) or other suitable circuit interface, for example for pressure sensor readouts, and inertial measurement unit (IMU), as well as wireless power transfer circuitry, wireless power transfer coil, and power source, as discussed above. External components may include, as illustrated, a Bluetooth enabled microcomputer for communication with the microsystem 100 and a wireless power transfer module.

An example application for microsystem 100 is within an oil well borehole. Conventional monitoring devices, such as cable slickline (wireline) devices and methods are relatively costly and risky. The use of free-flowing autonomous microsystems, such as microsystem 100, can eliminate, for example, risks of a gauge or cable becoming stuck or fixed within the well, while also allowing for data collection outside a main channel of the wellbore and permitting measurements to be performed deep within the reservoir. By adjusting the density of the filler particles 156 the microsystem 100 can be designed so as to have a density (i.e., target density) consistent with the intended application (e.g., effluent of the well)—that is, to have density-matched buoyancy, such that the microsystem 100 is free-flowing within the submerging fluid. If the microsystem 100 is too light pumping the microsystem 100 into the well may be too challenging, and conversely, if the microsystem 100 is too heavy retrieving the microsystem 100 from the well may be too challenging.

Figure 7A:
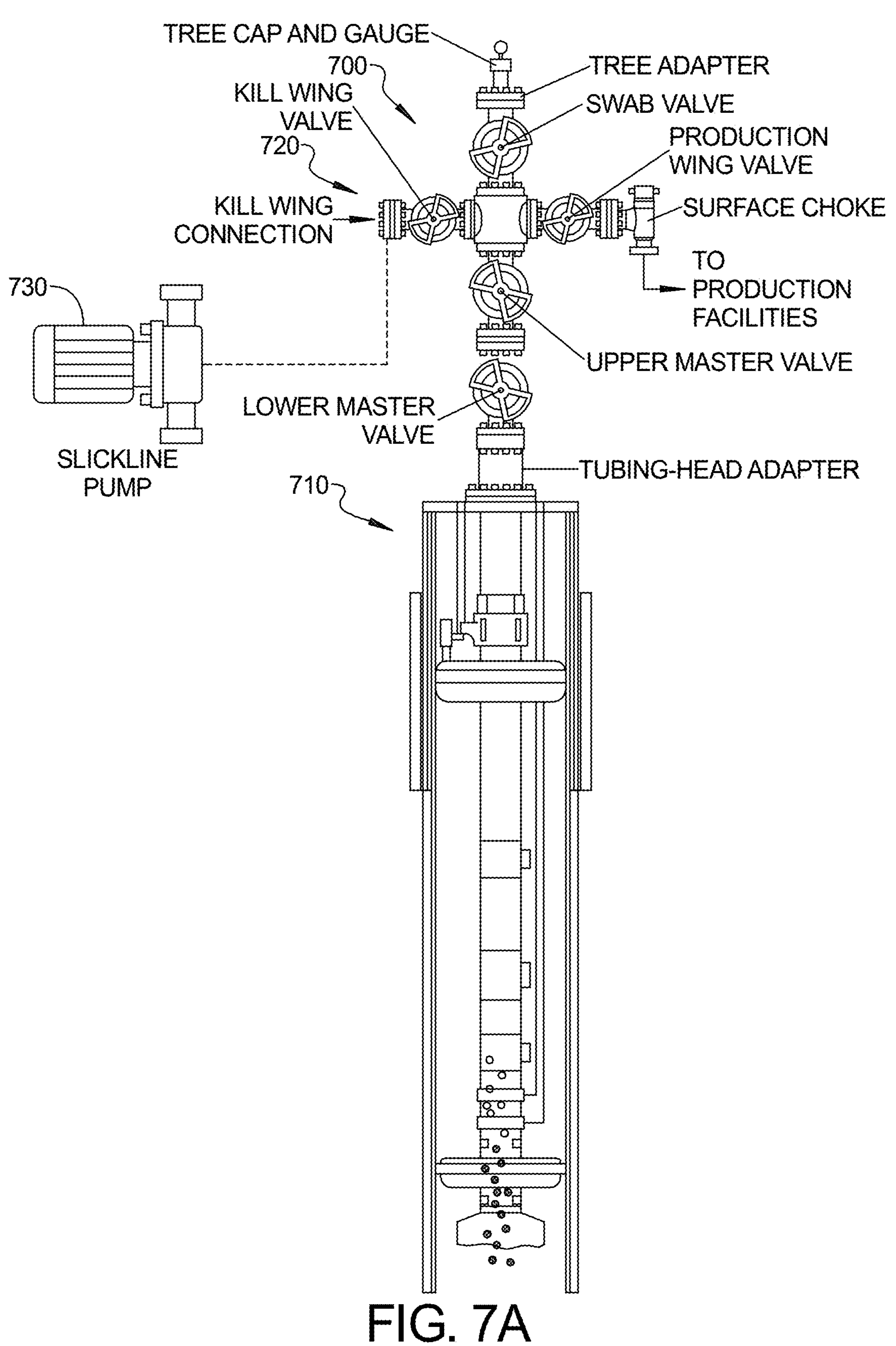
FIGS. 7A-7B are examples schematic of a wellhead of a dry tree well, which illustrates an example use for the example autonomous microsystem illustrated in FIGS. 1-3.
Figure 7B:
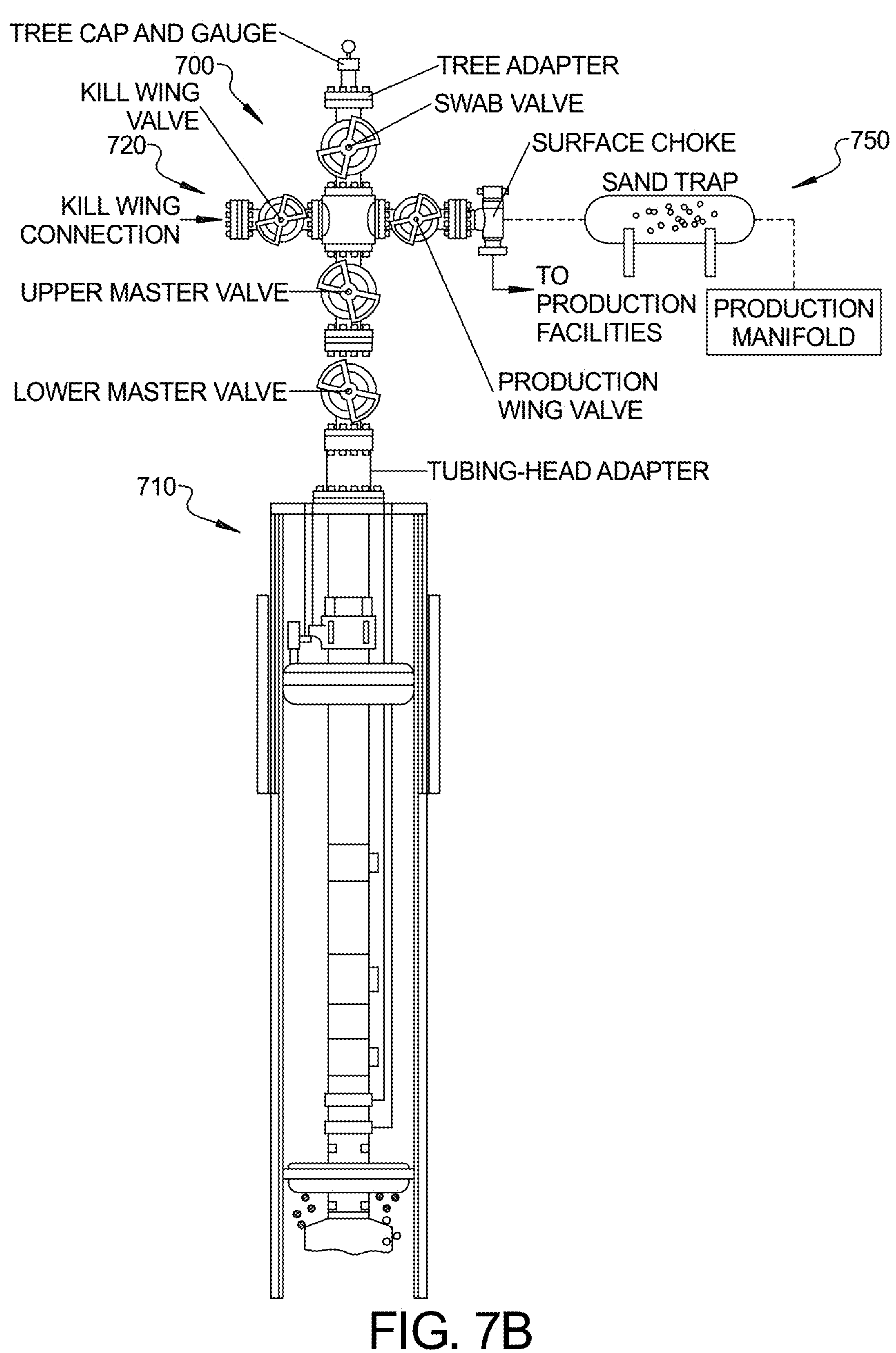

To use a microsystem prepared in accordance with the current technology, such as microsystem 100, within an oil well borehole 710, the microsystem 100 may be injected through a kill line 720 in a wellhead of a dry tree well 700 using a conventional pump 730, such as used for slickline operations, for example as illustrated in FIG. 7A. The well 710 may be stopped for a prescribed time interval so as to allow for static data acquisition. After the static data acquisition period, the well 710 may be restarted such that the microsystem 100 is transported to the wellhead 700 through a well tubing during a production phase. The microsystem 100 can then be extracted from the fluid path either at the wellhead level or in a sand trap system 750 located, for example, immediately downstream of a choke, for example as illustrated in FIG. 7B.

In other instances, a microsystem prepared in accordance with the current technology, such as microsystem 100, may be mounted on a wireline/slickline for use within an oil well borehole. For example, a small basket that contains the microsystem 100 can be attached to the wireline. Mounting the microsystem 100 onto wirelines can add low-cost monitoring capabilities to various operations that may require a wireline/slickline for other reasons.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to", or "coupled to" another element or layer, it may be directly on, engaged, connected or coupled to the other element or layer, or intervening elements or layers may be present. In contrast, when an element is referred to as being "directly on", "directly engaged to", "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An autonomous microsystem for immersion into a fluid, the autonomous microsystem comprising electronics, a power source, and a packaging system that surrounds the electronics and the power source, wherein the electronics are configured to sense and record one or more environmental conditions, and wherein the packaging system comprises:

a deformable shell that defines an internal space; and a plurality of filler particles disposed in the internal space and configured to control a density of the autonomous microsystem in relation to the fluid, wherein the filler particles comprise a low-density material having a bulk density greater than or equal to about 100 $kg/m^3$ and less than or equal to about 1,000 $kg/m^3$ and have a packing density greater than or equal to about $10^{11}/m^3$ and less than or equal to about $10^{21}/m^3$.

2. The autonomous microsystem of claim 1, wherein a flexible pouch is also disposed within the internal space and configured to house the electronics.

3. The autonomous microsystem of claim 2, wherein the flexible pouch is filled with a dielectric fluid.

4. The autonomous microsystem of claim 2, wherein the electronics comprise a wireless power transfer circuit configured to receive electrical power wirelessly from an external power source and supply power to the autonomous microsystem.

5. The autonomous micro system of claim 4, wherein each of the deformable shell and the flexible pouch has a substantially flat surface, wherein the substantially flat surface of the deformable shell is adjacent to and parallel with the substantially flat surface of the flexible pouch, and wherein the wireless power transfer circuit includes a coil that is disposed adjacent to and parallel with the substantially flat surface of the flexible pouch in which it is disposed.

6. The autonomous microsystem of claim 4, wherein the power source is a battery, and wherein a relay is electrically coupled between the wireless power transfer circuit, the battery, and the electronics, wherein the relay is configured to switch between supplying wireless power or battery power to the electronics.

7. The autonomous microsystem of claim 6, wherein the battery is a rechargeable battery, and wherein the relay is further configured to switch between distributing wireless power between the electronics and the rechargeable battery.

8. The autonomous microsystem of claim 1, wherein each of the filler particles of the plurality of filler particles are hollow particles having an average diameter greater than or equal to about 0.1 μm and less than or equal to about 100 μm.

9. The autonomous microsystem of claim 1, wherein an epoxy having a bulk density greater than or equal to about 300 $kg/m^3$ and less than or equal to about 2,000 $kg/m^3$ is also disposed with the plurality of filler particles in the internal space.

10. The autonomous microsystem of claim 1, wherein a getter material is also disposed within the internal space.

11. The autonomous microsystem of claim 1, wherein the deformable shell is a non-metallic polymeric shell having a Shore A Hardness between about 40 and about 100.

12. The autonomous microsystem of claim 1, wherein the deformable shell includes first and second halves, wherein the second half is configured to receive the first half so as to form an enclosed structure that defines the deformable shell.

13. The autonomous microsystem of claim 12, wherein a structural support is disposed on an interior-facing surface of the deformable shell adjacent to an overlap of the first and second halves of the deformable shell, wherein the structural support has a rigidity greater than the deformable shell.

14. An autonomous microsystem for immersion into a fluid, the autonomous microsystem comprising:

electronics configured to detect and record one or more environmental conditions, wherein the electronics comprises:

a wireless power transfer circuit configured to receive electrical power wirelessly from an external power source and supply power to the electronics; and a battery also configured to supply power to the electronics; and a packaging system that surrounds the electronics, wherein the packaging system comprises:

a deformable polymeric shell that defines an internal space, wherein the deformable polymeric shell has a first half and a second half having a substantially flat surface and configured to receive the first half so as to form an enclosed structure that defines the deformable polymeric shell;

a flexible pouch disposed within the internal space and configured to house the electronics, wherein the flexible pouch is filled with an insulating oil; and a plurality of hollow filler particles also disposed in the internal space and configured to control a density of the autonomous microsystem in response to the fluid.

15. The autonomous microsystem of claim 14, wherein each of the deformable polymeric shell and the flexible pouch has a substantially flat surface, wherein the substantially flat surface of the deformable polymeric shell is adjacent to and parallel with the substantially flat surface of the flexible pouch, and wherein the wireless power transfer circuit includes a coil that is disposed adjacent to and parallel with the substantially flat surface of the flexible pouch in which it is disposed.

16. The autonomous microsystem of claim 15, wherein a relay is electrically coupled between the wireless power transfer circuit, the battery, and the electronics, wherein the relay is configured to switch between supplying wireless power or battery power to the electronics.

17. The autonomous microsystem of claim 16, wherein the battery is a rechargeable battery, and wherein the relay is further configured to switch between distributing wireless power between the electronics and the rechargeable battery.

18. The autonomous microsystem of claim 14, wherein the plurality of hollow filler particles are cenospheres having a bulk density greater than or equal to about 100 $kg/m^3$ and less than or equal to about 1,000 $kg/m^3$ and have a packing density greater than or equal to about $10^{11}/m^3$ and less than or equal to about $10^{21}/m^3$.

19. The autonomous microsystem of claim 14, wherein at least one of an epoxy having a bulk density greater than or equal to about 300 $kg/m^3$ and less than or equal to about 2,000 $kg/m^3$ and a getter material is also disposed with the plurality of filler particles in the internal space.

20. The autonomous microsystem of claim 14, wherein the deformable polymeric shell has a Shore A Hardness between about 40 and about 100.

* * * * *